US009737047B2

(12) United States Patent
Boote

(10) Patent No.: US 9,737,047 B2
(45) Date of Patent: Aug. 22, 2017

(54) METHOD FOR THE TREATMENT, CONTROL, MINIMIZATION, AND PREVENTION OF BOVINE MASTITIS

(71) Applicant: Carey J. Boote, Holland, MI (US)

(72) Inventor: Carey J. Boote, Holland, MI (US)

(73) Assignee: CCD Holdings LLC, Holland, MI (US)

( * ) Notice: Subject to any disclaimer, the term of this patent is extended or adjusted under 35 U.S.C. 154(b) by 0 days.

(21) Appl. No.: 14/484,857

(22) Filed: Sep. 12, 2014

(65) Prior Publication Data

US 2014/0373791 A1 Dec. 25, 2014

Related U.S. Application Data

(63) Continuation-in-part of application No. 14/294,339, filed on Jun. 3, 2014, now Pat. No. 8,894,879, which is a continuation of application No. 13/569,702, filed on Aug. 8, 2012, now Pat. No. 8,765,010, which is a continuation-in-part of application No. 13/427,511, filed on Mar. 22, 2012, now Pat. No. 8,757,092.

(60) Provisional application No. 61/466,301, filed on Mar. 22, 2011.

(51) Int. Cl.
A01K 1/015 (2006.01)

(52) U.S. Cl.
CPC .......... A01K 1/0155 (2013.01); A01K 1/0152 (2013.01)

(58) Field of Classification Search
USPC ................ 252/184, 194, 190; 119/28.5, 171; 435/277; 264/109
See application file for complete search history.

(56) References Cited

U.S. PATENT DOCUMENTS

| | | | |
|---|---|---|---|
| 2,708,418 A * | 5/1955 | Sugarman et al. ............ | 119/172 |
| 3,845,939 A | 11/1974 | Waldenville | |
| 3,912,806 A | 10/1975 | Dowrick et al. | |
| 4,100,023 A | 7/1978 | McDonald | |
| 4,274,838 A | 6/1981 | Dale et al. | |
| 4,436,817 A | 3/1984 | Nemetz | |
| 4,458,629 A * | 7/1984 | Gerber ........................... | 119/172 |
| 4,609,431 A * | 9/1986 | Grose et al. ................... | 162/135 |
| 4,782,048 A | 11/1988 | Upton | |
| 4,798,802 A | 1/1989 | Ryan | |
| 5,054,434 A * | 10/1991 | Wax et al. ..................... | 119/171 |
| 5,441,640 A | 8/1995 | Baxter | |
| 5,453,376 A | 9/1995 | Ek | |
| 5,496,730 A | 3/1996 | Teramachi | |
| 5,587,320 A | 12/1996 | Shindo et al. | |
| 5,637,312 A * | 6/1997 | Tock et al. ..................... | 424/438 |
| 5,710,042 A | 1/1998 | Shindo et al. | |
| 5,797,872 A | 8/1998 | Ogata et al. | |
| 5,846,543 A | 12/1998 | Hassler et al. | |
| 5,858,962 A | 1/1999 | Blackburn et al. | |
| 6,276,300 B1 * | 8/2001 | Lewis et al. ................... | 119/172 |
| 6,299,774 B1 | 10/2001 | Ainsworth et al. | |
| 6,371,049 B1 * | 4/2002 | Boden et al. .................. | 119/171 |
| 6,386,144 B1 * | 5/2002 | Cathey ........................... | 119/172 |
| 6,451,589 B1 | 9/2002 | Dvorak | |
| 6,474,267 B1 * | 11/2002 | Padgett .......................... | 119/526 |
| 6,582,734 B1 * | 6/2003 | Wei et al. ...................... | 424/665 |
| 6,593,277 B2 * | 7/2003 | Adamoli et al. .............. | 504/367 |
| 6,613,562 B2 | 9/2003 | Dvorak | |
| 6,619,234 B2 * | 9/2003 | Sourek, Jr. ..................... | 119/172 |
| 6,667,301 B2 | 12/2003 | Dvorak et al. | |
| 6,698,380 B2 * | 3/2004 | Morrison ...................... | 119/28.5 |
| 6,742,478 B1 * | 6/2004 | Davis ............................. | 119/526 |
| 6,991,783 B2 * | 1/2006 | Santoiemmo ................. | 424/76.6 |
| 7,026,789 B2 | 4/2006 | Bozzone et al. | |
| 7,078,229 B2 | 7/2006 | Dvorak | |
| 7,094,778 B2 | 8/2006 | Dvorak et al. | |
| 7,179,642 B2 | 2/2007 | Dvorak | |
| 7,357,946 B2 * | 4/2008 | Adamoli et al. .............. | 424/474 |
| 7,361,648 B2 | 4/2008 | Dvorak et al. | |
| 7,617,798 B2 * | 11/2009 | Stevenson ...................... | 119/526 |
| 7,708,214 B2 * | 5/2010 | Medoff ........................... | 241/28 |
| 7,727,355 B2 * | 6/2010 | Goto et al. ..................... | 162/4 |
| 7,905,987 B2 * | 3/2011 | Kennedy ..................... | 162/181.4 |
| 7,909,995 B2 * | 3/2011 | Jiang et al. .................... | 210/206 |
| 8,012,312 B2 * | 9/2011 | Goto et al. ..................... | 162/231 |
| 8,202,721 B2 | 6/2012 | Dvorak | |
| 8,394,271 B2 | 3/2013 | Dvorak | |
| 8,414,808 B2 | 4/2013 | Dvorak et al. | |
| 8,470,177 B2 | 6/2013 | Dvorak | |
| 8,613,894 B2 | 12/2013 | Zhao et al. | |
| 8,757,092 B2 * | 6/2014 | Boote et al. ................... | 119/28.5 |
| 8,765,010 B2 * | 7/2014 | Boote et al. ................... | 252/184 |
| 8,835,155 B2 | 9/2014 | Dvorak | |
| 8,893,652 B2 * | 11/2014 | Boote et al. ................... | 119/28.5 |
| 8,894,879 B2 * | 11/2014 | Boote et al. ................... | 252/184 |
| 9,005,918 B2 | 4/2015 | Dvorak et al. | |
| 2002/0134315 A1 * | 9/2002 | Boden et al. .................. | 119/171 |

(Continued)

FOREIGN PATENT DOCUMENTS

| | | |
|---|---|---|
| EP | 0 359 873 | 3/1990 |
| EP | 2 138 171 | 12/2009 |
| WO | WO 98/48627 | 11/1998 |
| WO | WO 2014/001353 | 1/2014 |

OTHER PUBLICATIONS

PCT Written Opinion of the international Searching Authority for International Application No. PCT/US15/049802 mailed Dec. 10, 2015.

Primary Examiner — Joseph D Anthony
(74) Attorney, Agent, or Firm — King & Partners, PLC

(57) ABSTRACT

A method for the treatment, control, minimization, and/or prevention of bovine mastitis including the step of introducing animal bedding into a stall of a cow, wherein the animal bedding includes at least one solvent, and a lignocellulosic fiber, wherein the lignocellulosic fiber has been processed by ruminant digestion and anaerobic digestion.

6 Claims, 2 Drawing Sheets

(56) References Cited

U.S. PATENT DOCUMENTS

| | | |
|---|---|---|
| 2006/0150495 A1 | 7/2006 | MacConnell |
| 2007/0077235 A1* | 4/2007 | Loomis et al. |
| 2008/0035036 A1* | 2/2008 | Bassani et al. ............... 110/224 |
| 2009/0036566 A1* | 2/2009 | Li et al. ......................... 523/128 |
| 2009/0206028 A1* | 8/2009 | Jiang et al. .................... 210/603 |
| 2010/0212262 A1* | 8/2010 | Townsend ....................... 53/438 |
| 2010/0298386 A1 | 11/2010 | Burwell |
| 2011/0168611 A1 | 7/2011 | Early et al. |
| 2012/0285384 A1* | 11/2012 | Boote et al. ................. 119/28.5 |
| 2012/0301407 A1 | 11/2012 | Durham et al. |
| 2013/0126781 A1* | 5/2013 | Boote et al. .................. 252/184 |

\* cited by examiner

METHOD FOR THE TREATMENT, CONTROL, MINIMIZATION, AND PREVENTION OF BOVINE MASTITIS

CROSS-REFERENCE TO RELATED APPLICATIONS

This application is a continuation-in-part of U.S. application Ser. No. 14/294,339, filed Jun. 3, 2014, entitled "Lignocellulosic Fibrous Composites and Associated Methods for Preparing the Same," which is a continuation of U.S. application Ser. No. 13/569,702, filed Aug. 8, 2012, entitled "Lignocellulosic Fibrous Composites and Associated Methods for Preparing the Same," now U.S. Pat. No. 8,765,010, which is a continuation-in-part of U.S. application Ser. No. 13/427,511, filed Mar. 22, 2012, entitled "Animal Bedding and Associated Method for Preparing the Same," now U.S. Pat. No. 8,757,092, which claims the benefit of U.S. Provisional Application Ser. No. 61/466,301, filed Mar. 22, 2011, all of which are hereby incorporated herein by reference in their entirety, including all references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to the treatment, control, minimization, and/or prevention of mammary disorders in non-humans (e.g., bovine mastitis) and, more particularly, to the treatment, control, minimization, and/or prevention of bovine mastitis using animal bedding having one or more solvents and a lignocellulosic fiber that has been processed first by ruminant digestion and subsequently by anaerobic digestion.

2. Background Art

Bovine mastitis is one of the most common diseases in dairy cattle. Mastitis occurs when the udder becomes inflamed. Inflammation may be caused by many types of injury including infectious agents and their toxins, physical trauma or chemical irritants. Many microorganisms or bacteria have been identified as causing mastitis, but it is believed that serious cases of mastitis are in most instances caused by the following pathogens, namely: *Staphylococcus aureus, Streptococcus agalactiae, Streptococcus dysgalactiae, Streptococcus uberis* and *E. coli.*

The most common mastitis pathogens are found either in the udder (contagious pathogens) or the cow's surroundings (environmental pathogens). Contagious pathogens, such as *Streptococcus agalactiae* and *Staphylococcus aureus*, primarily colonize host tissue sites such as mammary glands, teat canals, and teat skin lesions and are generally spread from infected udders to healthy udders during the milking process. This can include through contaminated teatcup liners, milker's hands, paper or cloth towels used to wash or dry more than one cow, and possibly flies. Environmental pathogens, such as *streptococci, enterococci,* and *coliform* organisms, are commonly present within the cow's surroundings from sources such as cow feces, soil, plant material, bedding, or water; and infect by casual opportunistic contact with an animal. According to The Merck Veterinary Manual, environmental pathogens associated with the animal bedding used for housing cattle is the primary source of infection.

Mastitis causes compositional changes in milk, including an increase in somatic cell count (SCC). Milk from normal (uninfected) cows generally contain below 200,000 somatic cells/ml. An elevation in SCC, above 300,000 somatic cells/ml is abnormal and is an indication of inflammation of the udder. The types of somatic cells present in the milk change to mostly white blood cells, which add many proteolytic and lipolytic enzymes to milk. In addition, more blood serum leaks into the milk than usual. Dairy product quality defects resulting from mastitis are typically due to enzymatic breakdown of milk protein and fat. Casein, the major milk protein of high nutritional quality, declines and lower quality whey proteins increase which adversely impacts dairy product quality, such as cheese yield, flavor and quality. Protein breakdown in the milk can occur in milk from cows with clinical or subclinical mastitis due to the presence of proteolytic enzymes. Plasmin increases proteolytic activity more than two-fold during mastitis. Plasmin and enzymes derived from somatic cells can cause damage to casein in the udder before milk removal. Deterioration of the milk protein may also continue during processing and storage of milk from infected cows. Other compositional changes in the milk include a decrease in potassium and calcium levels.

Mastitis costs the United States dairy industry approximately two billion dollars annually or approximately 12 percent of the total United States milk production. The costs include reduced milk production, discarded milk, replacement cows, medication, labor, and veterinary services. Currently, acute mastitis is treated with antibiotics, anti-inflammatories and oxytocin. The treatments however are often time consuming (sometimes several successive intramammary applications), expensive, and not fully efficacious.

Various attempts at treating, controlling and/or preventing mastitis have been known in the art for years and are the subject of a plurality of publications and patents including: U.S. Pat. No. 6,582,734 entitled "Antimicrobial Composition Useful for the Treatment of Bovine Mastitis," U.S. Pat. No. 5,858,962 entitled "Composition for Treating Mastitis and Other Staphylococcal Infections," U.S. Pat. No. 5,846,543 entitled "Bovine Mastitis Treatment," U.S. Pat. No. 5,797,872 entitled "Method of Treating Domestic Animals Such as Cows for Mastitis and Apparatus for Injecting Ozone into Breasts," U.S. Pat. No. 4,782,048 entitled "Method for Treating or Preventing Bovine Mastitis," U.S. Pat. No. 3,912,806 entitled "Method of Treating Bovine Mastitis," United States Patent Application Publication No. 2012/0301407 entitled "Method of Treating a Mammalian Teat and Related Compositions," United States Patent Application Publication No. 2010/0298386 entitled "Compositions and Methods for Treating Mastitis," United States Patent Application Publication No. 2007/0077235 entitled "Composition and Method of Treating Mastitis," International Publication No. WO 2014/001353 A1 entitled "Pharmaceutical Compositions and Treatment of Mastitis," and European Publication No. 0 359 873 B1 entitled "Method of Treating Mastitis and Other Staphylococcal Infections," all of which are hereby incorporated herein by reference in their entirety—including all references cited therein.

U.S. Pat. No. 6,582,734 appears to disclose a two-part antimicrobial composition used in the treatment of bovine mastitis comprising at least one chlorine dioxide-generating component comprising at least one metal chlorite and at least one acid-forming compound in a solid carrier, and at least one liquid aqueous component. The composition further comprises at least one antimicrobial fatty acid having from approximately 2 to approximately 15 carbon atoms, and preferably from approximately 6 to approximately 12 carbon atoms. The components, upon mixing, form a composition having a pH in the range of approximately 5 to approximately 10.

U.S. Pat. No. 5,858,962 appears to disclose a composition for killing *staphylococci* comprising lysostaphin and an agent which synergistically enhances the bactericidal activity of the lysostaphin, and which is in an amount effective to produce the synergistic enhancement, selected from the group consisting of penicillin, bacitracin, methicillin, cephalosporin and polymyxin, and wherein the lysostaphin and the agent are together in amounts effective to kill *staphylococci*.

U.S. Pat. No. 5,846,543 appears to disclose chemical compositions for the treatment of bovine mastitis which are combinations of components, namely: *echinechea* goldenseal supreme, wild ginseng supreme, gelsemium, pokeroot, and aconite, and aloe vera juice, which form a dose which is injected into the mastitis affected portion of a cow's udder for a minimum of two doses per day for at least three days.

U.S. Pat. No. 5,797,872 appears to disclose a method and an apparatus for use in treating bovine mastitis by means of ozone chemotherapy without relying on drugs, such as antibiotics. An ozone injecting apparatus is also disclosed that comprises an ozone generator connected to an oxygen cylinder or an air compressor, an ozone guide tube for guiding ozone generated by the ozone generator, and an ozone injection nozzle fitted to the tip of the guide tube which is intended to be inserted into the teat orifice.

U.S. Pat. No. 4,782,048 appears to disclose a method for preventing or treating an animal (e.g., a cow) for mastitis, (e.g., bovine mastitis) by administering to the animal a composition comprising copper ion and an organic compound having at least two hydroxyl groups and at least one unsaturated carbon-carbon bond, (e.g., ascorbic acid) in an amount effective to prevent or treat mastitis.

U.S. Pat. No. 3,912,806 appears to disclose a method of treatment of mammary disorders of animals comprising the intra-mammary administration during the dry period of an antibiotic together with a substantially water-insoluble and oil-insoluble binding agent in the form of granules, wherein the binding agent constitutes five to twenty percent of the granules.

United States Patent Application Publication No. 2012/0301407 appears to disclose a method of treating or protecting a mammalian teat by applying a topical composition to the teat, wherein the topical conditioning composition comprises: citrate; methylene blue; and an alkyl para-hydroxybenzoate.

United States Patent Application Publication No. 2010/0298396 appears to disclose compositions that are effective in controlling or in preventing mastitis in an animal. The disclosed compositions comprise a biocidal system, comprising a primary biocide and a preservative component; a nonionic surfactant having an hydrophilic-lipophilic balance (HLB) from approximately 10 to approximately 20; an emollient system comprising an extradermal penetrating agent and an emollient base; a thickening agent; and an aqueous based carrier.

United States Patent Application Publication No. 2007/0077235 appears to disclose methods and compositions for treating bacterial infections with bacteria-associated phage proteins, enzymes or peptides, and/or peptide fragments thereof. More specifically, the '235 reference pertains to phage lytic and/or holin proteins, or peptides and peptide fragments thereof, blended with a carrier for the treatment and prophylaxis of bacterial infections for mastitis.

International Publication No. WO 2014/001353 A1 appears to disclose a pharmaceutical composition and method of treating and/or preventing mastitis in non-human mammals. More particularly, the '353 reference relates to the treatment of mastitis in cows. The pharmaceutical composition comprises a mixture of a phosphonic acid and at least one antimicrobial agent.

European Publication No. 0 359 873 B1 appears to disclose a lysostaphin-containing composition for killing *staphylococci* (and which therefore does not itself contain *staphylococci*), characterized in that it also comprises at least one cell wall-active antibiotic in an amount effective synergistically to enhance the bactericidal effect of lysostaphin against staphylococcal mastitis.

While compositions and methods for treating mastitis have been known in the art for years, there is a need for a treatment, control, minimization, and/or prevention option which improves the efficacy of the current standards and/or provides acceptable efficacy with additional positive assets, for example, reduced milk withdrawal, reduced duration of treatment, and/or a less costly treatment option.

There is also a need to improve the treatment, control, minimization, and/or prevention of bovine mastitis using animal bedding having one or more solvents and a lignocellulosic fiber that has been processed first by ruminant digestion and subsequently by anaerobic digestion—without the use of antibiotics and/or toxic chemicals.

These and other objects of the present invention will become apparent in light of the present specification, claims, and drawings.

SUMMARY OF THE INVENTION

In one embodiment, the present invention is directed to a method for the treatment, control, minimization, and/or prevention of bovine mastitis comprising the step of: introducing animal bedding into a stall of a cow, wherein the animal bedding comprises: (1) at least one solvent; and (2) a lignocellulosic fiber, wherein the lignocellulosic fiber has been processed by ruminant digestion and anaerobic digestion.

In a preferred embodiment of the present invention, the at least one solvent comprises water.

In another preferred embodiment of the present invention, the at least one solvent is present in a concentration of less than approximately 75% by weight, less than approximately 70% by weight, less than approximately 65% by weight, less than approximately 60% weight, less than approximately 55% weight, and/or less than approximately 50% weight.

In yet another preferred embodiment of the present invention, the lignocellulosic fiber compromises processed lignin, hemicellulose, and/or cellulose.

In a preferred embodiment of the present invention, the fiber density of the animal bedding ranges from approximately 0.950 grams per cubic centimeter to approximately 1.40 grams per cubic centimeter.

In one aspect of the present invention the pH of the animal bedding ranges from greater than approximately 7 to less than approximately 10.5.

In a preferred embodiment of the present invention, the average particle size of the lignocellulosic fiber is less than approximately 10 microns.

In another preferred embodiment of the present invention, the animal bedding is pelletized and the specific density of the animal bedding pellets ranges from approximately 0.400 grams per cubic centimeter to approximately 0.850 grams per cubic centimeter. In this embodiment the at least one solvent is preferably present in a concentration of less than approximately 25% by weight, and the lignocellulosic fiber is present in a concentration of greater than approximately 40% by weight, and more preferably present in a concentration of greater than approximately 50% by weight.

The present invention is also directed to, in one embodiment, a method for the treatment, control, minimization, and/or prevention of bovine mastitis comprising the steps of: (a) introducing animal bedding into a stall of a cow, wherein the animal bedding comprises: (1) at least one solvent; and (2) a lignocellulosic fiber, wherein the lignocellulosic fiber has been processed by ruminant digestion and anaerobic digestion; and (2) maintaining a normalized somantic cell count (SCC) in milk for the cow introduced to the animal bedding.

In a preferred embodiment of the present invention, the SCC in milk for the cow introduced to the animal bedding remains below approximately 300,000 somatic cells/ml, more preferably below approximately 250,000 somatic cells/ml, yet more preferably below approximately 200,000 somatic cells/ml, and most preferably below approximately 150,000 somatic cells/ml.

The present invention is further directed to, in one embodiment, a method for the treatment, control, minimization, and/or prevention of bovine mastitis comprising the steps of: (a) introducing animal bedding into a stall of a cow, wherein the animal bedding comprises: (1) at least one solvent, wherein the at least one solvent is present in a concentration of less than approximately 70% by weight; and (2) a lignocellulosic fiber, wherein the lignocellulosic fiber has been processed by ruminant digestion and anaerobic digestion; (b) maintaining a somantic cell count (SCC) below approximately 300,000 somatic cells/ml in milk for the cow introduced to the animal bedding; (c) removing the animal bedding introduced into the stall of the cow; and (d) introducing new animal bedding after a period of time into the stall of the cow, wherein the new animal bedding comprises: (1) at least one solvent, wherein the at least one solvent is present in a concentration of less than approximately 70% by weight; and (2) a lignocellulosic fiber, wherein the lignocellulosic fiber has been processed by ruminant digestion and anaerobic digestion.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
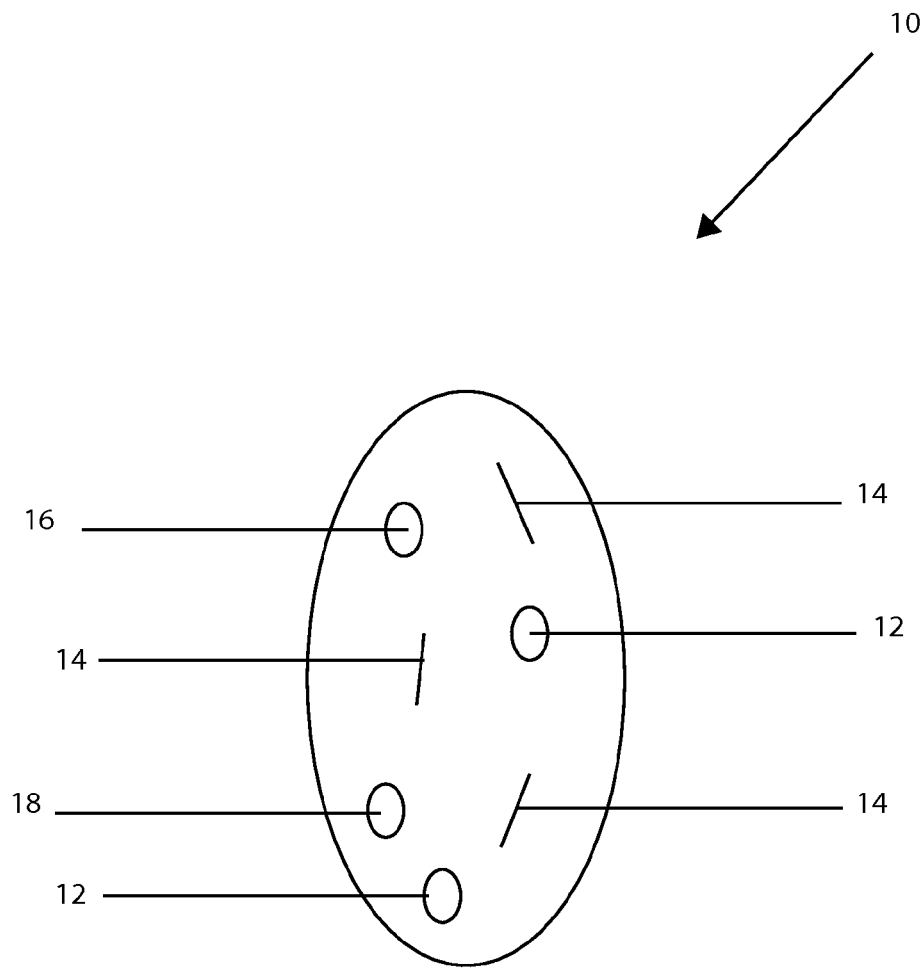
FIG. 1 of the drawings is a cross-sectional view of animal bedding manufactured in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

Figure 2:
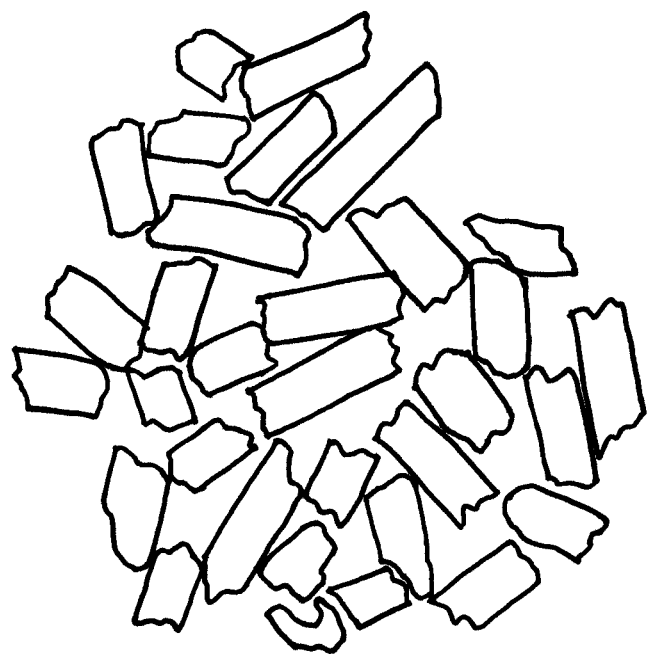
FIG. 2 of the drawings is a perspective view of pelletized animal bedding manufactured in accordance with the present invention.

It will be understood that like or analogous elements and/or components, referred to herein, may be identified throughout the drawings with like reference characters. It will be further understood that one or more of FIGS. 1-2 are merely schematic representations of animal bedding. As such, some of the components have been distorted from their actual scale for pictorial clarity.

In accordance with the present invention, the animal bedding disclosed herein is configured for use in a plurality of applications including, but not limited to, dairy bedding (e.g., daily use and/or in the treatment of bovine mastitis), horse bedding, cat bedding, small animal bedding, etcetera. The animal bedding of the present invention, among other benefits, is adapted for the treatment, control, minimization, and/or prevention of bovine mastitis, has substantially longer stall life (i.e., utilization time), reduces store, farm and/or stall management costs, reduces cleaning costs, reduces material disposal costs, reduces veterinary costs, relative to commercially available animal bedding. Moreover, the animal bedding of the present invention is a direct result of the conversion of waste material to a resource which is biodegradable, compostable, and sustainable with respect to biological systems.

Referring now to the drawings and to FIG. 1 in particular, animal bedding 10 is shown which generally comprises one or more solvents 12 and lignocellulosic fiber 14. It will be understood that lignocellulosic fiber 14 has been processed by both ruminant digestion and supplemental anaerobic digestion. In particular, the ruminant digestion typically occurs in a cow or other animal and the supplemental anaerobic digestion occurs in an anaerobic digester which is commercially available from any one of a number or sources, including Pagel's Ponderosa Dairy Farm, Kewaunee, Wis., and Vir-Clar Dairy Farm, Fond du Lac, Wis. It will be understood that sequential ruminant digestion followed by anaerobic digestion chemically and physically alters the original animal excrement into a material having different physical and chemical properties.

One or more solvents 12 of animal bedding 10 preferably comprise water, but other solvents are likewise contemplated for use in accordance with the present invention, including nonpolar solvents (e.g., pentane, hexane, benzene, toluene, chloroform, diethyl ether, etcetera) polar aprotic solvents (e.g., acetone, propylene carbonate, tetrahydrofuran, etcetera) and/or polar protic solvents (e.g., water, methanol, ethanol, isopropanol, acetic acid, formic acid, etcetera). Preferably, the concentration of one or more solvents 12 is less than approximately 70% by weight, and more preferably less than approximately 50% weight. It will be understood that other solvent concentrations, depending upon bedding application, are likewise suitable for use in accordance with the present invention, including less than approximately 75%, less than approximately 70%, less than approximately 65%, less than approximately 60%, less than approximately 55%, less than approximately 50%, less than approximately 45%, less than approximately 40%, less than approximately 35%, less than approximately 30%, less than approximately 25%, less than approximately 20%, less than approximately 15%, less than approximately 12%, less than approximately 10%, less than approximately 7%, less than approximately 5%, less than approximately 2%, less than approximately 1%, etcetera. It will be understood that one or more solvents 12 of animal bedding 10 are entrapped into the structure of lignocellulosic fiber 14, which among other things, provides for a sponge-like characteristic, as well as facilitates the initiation of cellular absorption. It will be further understood that one or more solvents 12 of animal bedding 10 facilitates attractive forces, including, but not limited to, Van der Waals forces and/or hydrogen bonding between atoms, molecules, and/or surfaces of lignocellulosic fiber 14—including lignin, hemicellulose, and/or cellulose and fibers of the same—just to name a few.

In one embodiment, lignocellulosic fiber 14 includes a combination of lignin, hemicellulose, and cellulose. However, as will be discussed in greater detail below, lignocellulosic fiber 14 may comprise other materials. After being processed by both ruminant digestion and supplemental anaerobic digestion, the fiber density of animal bedding 10 preferably ranges from approximately 0.950 grams per cubic centimeter to approximately 1.40 grams per cubic centimeter. Additionally, lignocellulosic fiber 14 of animal bedding 10 is present in a concentration of greater than approximately 40% by weight, and more preferably present in a concentration of greater than approximately 50% by weight. It will be understood that other lignocellulosic fiber concentrations, depending upon bedding application, are likewise suitable for use in accordance with the present invention, including greater than approximately 1%, greater than approximately 2%, greater than approximately 5%, greater than approximately 7%, greater than approximately 10%, greater than approximately 12%, greater than approximately 15%, greater than approximately 20%, greater than approximately 25%, greater than approximately 30%, greater than approximately 35%, greater than approximately 40%, greater than approximately 45%, greater than approximately 50%, greater than approximately 55%, greater than approximately 60%, greater than approximately 65%, greater than approximately 70%, greater than approximately 75%, greater than approximately 80%, etcetera.

In one preferred embodiment of the present invention, animal bedding 10 preferably comprises an alkaline pH which ranges from greater than approximately 7 to less than approximately 10.5. However, it will be understood that non-alkaline pH's are contemplated for certain applications.

In another preferred embodiment of the present invention, animal bedding 10 includes lignocellulosic fiber 14 which preferably comprises an average particle size of less than approximately 10 microns, and in certain embodiments less than approximately 5 microns.

As is best shown in FIG. 2, in one embodiment of the present invention, animal bedding 10 is pelletized. In this embodiment the specific density of the animal bedding pellets preferably ranges from approximately 0.400 grams per cubic centimeter to approximately 0.850 grams per cubic centimeter.

When animal bedding 10 is in pellet form, one or more solvents 12 are preferably present in a concentration of less than approximately 25% by weight.

In a preferred embodiment of the present invention, animal bedding 10 may comprise a hybrid of pelletized (e.g., material that is generally homogenous, substantially free flowing, and/or compressed into a recognizable form) and non-pelletized material. In this embodiment the weight ratio of pelletized to non-pelletized material preferably ranges from approximately 1:10 to approximately 10:1, and more preferably ranges from approximately 1:5 to approximately 5:1, and yet more preferably ranges from approximately 1:3 to approximately 3:1.

Animal bedding 10 may also include odor suppressant 16. Odor suppressant 16 preferably comprises an organic ester to mask urine and/or feces odor, and may also comprise an odor neutralizer which converts urea to a less odoriferous compound.

In accordance with the present invention, animal bedding 10 may also include indicator 18 which visually identifies when animal bedding 10 has been soiled by an animal. Non-limiting examples of indicators 18 include 3-amino-7-dimethylamino-2-methylphenazine hydrochloride and 3,3-bis(4-hydroxy-2-methyl-5-propan-2-ylphenyl)-2-benzofuran-1-one—just to name a few.

In one preferred embodiment of the present invention, animal bedding 10 may optionally be associated (e.g., doped) with one or more alkali metal ions, one or more alkaline earth metal ions, one or more transition metal ions, one or more antibiotics, one or more medicaments, one or more microbiocidally-active components, and/or one or more adjunct agents.

The present invention is also directed to a method for preparing pelletized animal bedding, comprising the following steps. First, a ruminant animal (e.g., cow, cattle, goat, sheep, giraffe, bison, moose, elk, yak, water buffalo, deer, camel, alpaca, llama, antelope, pronghorn, nilgai, etcetera) is fed with sufficient quantities of bast and/or bast type fibre from one or more sources including, but not limited to, corn, wheat, etcetera. Second, excrement from the ruminant animal which has undergone ruminant digestion via the animal is obtained. Next, the animal excrement is associated with (e.g., placed in) an anaerobic digester which generates a first wet product. After the first wet product is generated, it is optionally densified an/or placed into a dryer which generates a first dry product. The first dry product is suitable for use as animal bedding 10, but may also be further densified and/or pelletized using conventional techniques (e.g., compression densification and/or pelletization). One commercial source for pelletization is Michigan Wood Fuel Pellets, Holland, Mich. Lastly, the first wet product and/or the first dry product may be bleached or color altered prior to, during, and/or after densifying the first dry product. It will be understood that the first wet product may be densified via, cold pressing, hot pressing, stream pressing, mechanical pressing, roll pressing, in addition to and/or instead of heat drying.

The present invention is further directed to a method for the treatment, control, minimization, reduction, substantial reduction (e.g., greater than 50%), substantial prevention, prevention and/or eradication of bovine mastitis comprising the step of: introducing animal bedding into a stall of a cow, wherein the animal bedding comprises: (1) at least one solvent; and (2) a lignocellulosic fiber, wherein the lignocellulosic fiber has been processed by ruminant digestion and anaerobic digestion. It will be understood that the animal bedding is changed after a period of time.

The present invention is yet further directed to a method for the treatment, control, minimization, reduction, substantial reduction, substantial prevention, prevention and/or eradication of bovine mastitis comprising the steps of: (a) introducing animal bedding into a stall of a cow, wherein the animal bedding comprises: (1) at least one solvent; and (2) and a lignocellulosic fiber, wherein the lignocellulosic fiber has been processed by ruminant digestion and anaerobic digestion; and (b) maintaining a normalized somantic cell count (SCC) in milk for the cow introduced to the animal bedding. Preferably, the SCC in milk for the cow introduced to the animal bedding remains below approximately 300,000 somatic cells/ml, more preferably below approximately 250,000 somatic cells/ml, yet more preferably below approximately 200,000 somatic cells/ml, and even yet more preferably below approximately 150,000 somatic cells/ml.

The present invention is also directed to the treatment, control, minimization, reduction, substantial reduction, substantial prevention, prevention and/or eradication of bovine mastitis comprising the steps of: (a) introducing animal bedding into a stall of a cow, wherein the animal bedding comprises: (1) at least one solvent, wherein the at least one solvent is present in a concentration of less than approximately 70% by weight; and (2) a lignocellulosic fiber, wherein the lignocellulosic fiber has been processed by ruminant digestion and anaerobic digestion; (b) maintaining a somantic cell count (SCC) below approximately 300,000 somatic cells/ml in milk for the cow introduced to the animal bedding; (c) removing the animal bedding introduced into the stall of the cow; and (d) introducing new animal bedding after a period of time into the stall of the cow, wherein the new animal bedding comprises: (1) at least one solvent, wherein the at least one solvent is present in a concentration of less than approximately 70% by weight; and (2) a lignocellulosic fiber, wherein the lignocellulosic fiber has been processed by ruminant digestion and anaerobic digestion.

The invention is further described by the following examples.

Example I

Pelletized Perfect Cycle™ Natural Bedding, which is commercially available from Eco-Composites LLC, Holland, Mich., is placed into a horse stall. On the same day traditional wood shaving bedding is placed into a separate horse stall. After approximately three days of use, the traditional wood shaving bedding is saturated to the point where the horse is showing signs of dissatisfaction with the bedding. However, the Perfect Cycle™ Natural Bedding of the present invention, is still acceptably absorbent after fifteen days and substantial fiber deterioration and/or breakdown is not observed until after about 21 days. The Perfect Cycle™ Natural Bedding exhibits a plurality of superior features/characteristics including five times the absorbency and product life compared to traditional wood shaving bedding. Moreover, the odor emanating from the stall with the Perfect Cycle™ Natural Bedding is substantially more acceptable compared to the odor emanating from the stall with the traditional wood shaving bedding. Furthermore, due to, at least in part, the solvent configuration, composition and/or concentration of the Perfect Cycle™ Natural Bedding, the dust observed in the horse stall is substantially reduced compared to the dust observed in the stall with the traditional wood shaving bedding. Lastly, after use, the Perfect Cycle™ Natural Bedding is readily compostable, whereas the traditional wood shaving bedding is required to be disposed of using traditional resources.

Example II

Pelletized Perfect Cycle™ Natural Bedding, which is commercially available from Eco-Composites LLC, Holland, Mich., is placed into a plurality of cow stalls. On the same day traditional cow bedding is placed into a plurality of separate cow stalls. After approximately 3-5 days of use, the traditional bedding is saturated. However, the Perfect Cycle™ Natural Bedding of the present invention, is still acceptably absorbent after fifteen days and substantial fiber deterioration and/or breakdown is not observed until after about 21 days. The Perfect Cycle™ Natural Bedding exhibited a plurality of superior features/characteristics including five times the absorbency and product life compared to traditional bedding. Moreover, the odor emanating from the stalls with the Perfect Cycle™ Natural Bedding is substantially more acceptable compared to the odor emanating from the stall with the traditional bedding. Furthermore, due to, at least in part, the solvent configuration, composition and/or concentration of the Perfect Cycle™ Natural Bedding, the dust observed in the stall is substantially reduced compared to the dust observed in the stall with the traditional bedding. Moreover, after use, the Perfect Cycle™ Natural Bedding is readily compostable, whereas the traditional wood shaving bedding is required to be disposed of using traditional resources. Remarkably, normalized somantic cell count (SCC) in milk for the cows introduced to the Perfect Cycle™ Natural Bedding is observed, namely SCC below approximately 300,000 somatic cells/ml, below approximately 250,000 somatic cells/ml, below approximately 200,000 somatic cells/ml, and below approximately 150,000 somatic cells/ml.

Example III

Loose fiber Perfect Cycle™ Natural Bedding, which is commercially available from Eco-Composites LLC, Holland, Mich., is placed into a plurality of cow stalls. On the same day traditional cow bedding is placed into a plurality of separate cow stalls. After approximately 3-5 days of use, the traditional bedding is saturated. However, the Perfect Cycle™ Natural Bedding of the present invention, is still acceptably absorbent after fifteen days and substantial fiber deterioration and/or breakdown is not observed until after about 21 days. The Perfect Cycle™ Natural Bedding exhibited a plurality of superior features/characteristics including five times the absorbency and product life compared to traditional bedding. Moreover, the odor emanating from the stalls with the Perfect Cycle™ Natural Bedding is substantially more acceptable compared to the odor emanating from the stall with the traditional bedding. Furthermore, due to, at least in part, the solvent configuration, composition and/or concentration of the Perfect Cycle™ Natural Bedding, the dust observed in the stall is substantially reduced compared to the dust observed in the stall with the traditional bedding. Moreover, after use, the Perfect Cycle™ Natural Bedding is readily compostable, whereas the traditional wood shaving bedding is required to be disposed of using traditional resources. Remarkably, normalized somantic cell count (SCC) in milk for the cows introduced to the Perfect Cycle™ Natural Bedding is observed, namely SCC below approximately 300,000 somatic cells/ml, below approximately 250,000 somatic cells/ml, below approximately 200,000 somatic cells/ml, and below approximately 150,000 somatic cells/ml.

Example IV

Loose fiber Perfect Cycle™ Natural Bedding, which is commercially available from Eco-Composites LLC, Holland, Mich., is placed into several rabbit cages. On the same day typical bedding (frequently wood shavings or sawdust) is placed into a similar set of rabbit cages with individual rabbits in each cage. After approximately 2-4 days the typical bedding is saturated. However, the Perfect Cycle™ Natural Bedding of the present invention, is still absorbing acceptably, after 10 days, and substantial fiber deterioration is not observed until about 15 days. The Perfect Cycle™ Natural Bedding exhibited a plurality of superior features/characteristics including five times the absorbency and product life compared to traditional bedding. Moreover, the odor emanating from the cages with the Perfect Cycle™ Natural Bedding is substantially more acceptable compared to the odor emanating from the stall with the traditional bedding. Furthermore, due to, at least in part, the solvent configuration, composition and/or concentration of the Perfect Cycle™ Natural Bedding, the dust observed in the stall is substantially reduced compared to the dust observed in the stall with the traditional bedding. Moreover, after use, the Perfect Cycle™ Natural Bedding is readily compostable, whereas the traditional wood shaving bedding is required to be disposed of using traditional resources. Small animal cages used for zoo animals and home-owned pets, are susceptible to fast build-up of coliform pathogen, when bedded with the many second use materials such as wood products and recycled paper; while Perfect Cycle™ Natural Bedding reduces the pathogen concern in small animal management.

The foregoing description merely explains and illustrates the invention and the invention is not limited thereto except insofar as the appended claims are so limited, as those skilled in the art who have the disclosure before them will be able to make modifications without departing the scope of the invention.

What is claimed and desired to be secured by Letters Patent of the United States is:

1. A method for the treatment, control, minimization, and/or prevention of bovine mastitis, comprising the steps of:
    introducing animal bedding into a stall of a cow, wherein the animal bedding comprises: (1) at least one solvent; (2) a lignocellulosic fiber, wherein the lignocellulosic fiber has been processed by ruminant digestion and anaerobic digestion, (3) an indicator, wherein the indicator comprises at least one of 3-amino-7-dimethyl-amino-2-methylphenazine hydrochloride and 3,3-bis(4-hydroxy-2-methyl-5-propan-2-ylphenyl)-2-benzofuran-1-one, and (4) a microbiocidally-active component; and
    maintaining a normalized somantic cell count (SCC) in milk for the cow introduced to the animal bedding.

2. The method according to claim 1, wherein the SCC in milk for the cow introduced to the animal bedding remains below approximately 300,000 somatic cells/ml.

3. The method according to claim 1, wherein the SCC in milk for the cow introduced to the animal bedding remains below approximately 250,000 somatic cells/ml.

4. The method according to claim 1, wherein the SCC in milk for the cow introduced to the animal bedding remains below approximately 200,000 somatic cells/ml.

5. The method according to claim 1, wherein the SCC in milk for the cow introduced to the animal bedding remains below approximately 150,000 somatic cells/ml.

6. A method for the treatment, control, minimization, and/or prevention of bovine mastitis, comprising the steps of:
    introducing animal bedding into a stall of a cow, wherein the animal bedding comprises: (1) at least one solvent; (2) a lignocellulosic fiber, wherein the lignocellulosic fiber has been processed by ruminant digestion and anaerobic digestion, (3) an indicator, wherein the indicator comprises at least one of 3-amino-7-dimethyl-amino-2-methylphenazine hydrochloride and 3,3-bis(4-hydroxy-2-methyl-5-propan-2-ylphenyl)-2-benzofuran-1-one, (4) a microbiocidally-active component, and (5) at least one of an alkali metal ion, an alkaline earth metal ion, and a transition metal ion; and
    maintaining a normalized somantic cell count (SCC) in milk for the cow introduced to the animal bedding.

* * * * *